(12) United States Patent
Mitsuhashi et al.

(10) Patent No.: US 10,569,644 B2
(45) Date of Patent: Feb. 25, 2020

(54) MOUNTING STRUCTURE FOR INTEGRATED COMPONENT OF FUEL TANK

(71) Applicant: YACHIYO INDUSTRY CO., LTD., Saitama (JP)

(72) Inventors: Hiroya Mitsuhashi, Tochigi (JP); Manabu Omori, Tochigi (JP); Shunsuke Tsukahara, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 16/345,583

(22) PCT Filed: Oct. 4, 2017

(86) PCT No.: PCT/JP2017/036097
§ 371 (c)(1),
(2) Date: Apr. 26, 2019

(87) PCT Pub. No.: WO2018/079209
PCT Pub. Date: May 3, 2018

(65) Prior Publication Data
US 2019/0337379 A1    Nov. 7, 2019

(30) Foreign Application Priority Data

Oct. 27, 2016 (JP) ................. 2016-210825

(51) Int. Cl.
*B60K 15/03* (2006.01)
*F16L 37/088* (2006.01)
*F16L 37/14* (2006.01)

(52) U.S. Cl.
CPC ............ *B60K 15/03* (2013.01); *F16L 37/088* (2013.01); *B60K 2015/03467* (2013.01); *F16L 37/144* (2013.01)

(58) Field of Classification Search
CPC .......... B60K 15/03; B60K 2015/03467; F16L 37/088; F16L 37/144
See application file for complete search history.

(56) References Cited

U.S. PATENT DOCUMENTS 6,679,399 B2 *   1/2004   Franjo .............. B60K 15/03177
                                                                220/23.4
6,899,248 B2 *   5/2005   Reinelt ............ B60K 15/03177
                                                                220/4.13

(Continued)

FOREIGN PATENT DOCUMENTS

FR     2910109 A1     6/2008
JP     H07-31154 U    6/1995

(Continued)

OTHER PUBLICATIONS

International Search Report and Written Opinion of the International Search Report for PCT/JP2017/036097 dated Jan. 9, 2018.

(Continued)

*Primary Examiner* — Matthieu F Setliff
(74) *Attorney, Agent, or Firm* — Kenealy Vaidya LLP

(57) ABSTRACT

The present invention provides a mounting structure for an integrated component to be mounted by snap-fitting on a fuel tank so that it is possible to suppress looseness. This mounting structure for an integrated component of a fuel tank includes: a weld clip which has a tip part having an engaging portion and a base end part to be welded to an inner surface of the fuel tank; an engagement base which is provided to the integrated component to be integrated into the fuel tank, and has a snap-fitting arm to be engaged with the engaging portion by elastic restoring force; and a lock member which is attached to the engagement base so as to be capable of switching from a temporary holding position to a lock position, the temporary holding position allowing an elastic deformation of the snap-fitting arm in a direction (Continued)

to release the engagement with the engaging portion, the lock position preventing the elastic deformation.

11 Claims, 7 Drawing Sheets

(56) References Cited

U.S. PATENT DOCUMENTS

| | | | | |
|---|---|---|---|---|
| 7,390,025 | B2* | 6/2008 | Pepe | F16L 37/088 |
| | | | | 285/93 |
| 8,240,716 | B2* | 8/2012 | Kerin | F16L 37/144 |
| | | | | 285/321 |
| 8,336,919 | B2* | 12/2012 | Gillet | F16L 37/088 |
| | | | | 285/319 |
| 2005/0218650 | A1* | 10/2005 | Pepe | F16L 37/088 |
| | | | | 285/308 |
| 2010/0032937 | A1* | 2/2010 | Kerin | F16L 37/144 |
| | | | | 285/3 |
| 2010/0276924 | A1 | 11/2010 | Gillet et al. | |
| 2016/0200192 | A1 | 7/2016 | Tsukahara et al. | |

FOREIGN PATENT DOCUMENTS

| | | | |
|---|---|---|---|
| JP | 2005-127267 | A | 5/2005 |
| JP | 2009-121668 | A | 6/2009 |
| JP | 2010-261588 | A | 11/2010 |
| JP | 2013-220704 | A | 10/2013 |
| JP | 2015-085915 | A | 5/2015 |
| JP | 6235869 | B2 | 11/2017 |
| WO | 2015/064315 | A1 | 5/2015 |
| WO | 2018/079209 | A1 | 5/2018 |

OTHER PUBLICATIONS

International Preliminary Report on Patentability for PCT/JP2017/036097 dated Nov. 13, 2018.

* cited by examiner

MOUNTING STRUCTURE FOR INTEGRATED COMPONENT OF FUEL TANK

CROSS-REFERENCE TO RELATED APPLICATIONS

This application is a U.S. National Stage Application under 35 U.S.C § 371 of International Patent Application No. PCT/JP2017/036097 filed 4 Oct. 2017, which claims the benefit of priority to Japanese Patent Application No. 2016-210825 filed 27 Oct. 2016, the disclosures of all of which are hereby incorporated by reference in their entireties.

TECHNICAL FIELD

The present invention relates to a mounting structure for an integrated component of a fuel tank.

BACKGROUND ART

There is known a technique for mounting a valve via a weld base on an inner surface of a resin fuel tank. A technique by which a valve is mounted by snap-fitting on a weld base is described in the patent literature 1.

PRIOR ART LITERATURE

Patent Literature

Patent literature 1: JP 2005-127267, A

SUMMARY OF THE INVENTION

Problems to be Solved by the Invention

However, on the mounting structure by snap-fitting, there is a fear that the valve looses since a joined portion is elastically deformed because of vibrations and so on of a vehicle.

The present invention is created to solve such problems, and it is an object of the present invention to provide a mounting structure for an integrated component to be mounted by snap-fitting on a fuel tank such that looseness can be suppressed.

Means for Solving the Problems

In order to solve the problems, the present invention is characterized in that the mounting structure includes a weld clip which has a tip part having an engaging portion and a base end part to be welded to an inner surface of a fuel tank; an engagement base which is provided to an integrated component to be integrated into the fuel tank, and has a snap-fitting arm to be engaged with the engaging portion by elastic restoring force; and a lock member which is attached to the engagement base so as to be capable of switching from a temporary holding position to a lock position, the temporary holding position allowing an elastic deformation of the snap-fitting arm in a direction to release an engagement with the engaging portion, the lock position preventing the elastic deformation, in that the snap-fitting arm includes an elastic arm which is extended along a periphery of the engaging portion from a base end integrated with a peripheral wall portion of the engagement base and is supported by the peripheral wall portion at the base end with a cantilever supporting structure to be capable of being elastically deformed in a radial direction of the engaging portion; and an engaged portion which is provided to the elastic arm and is engaged with the engaging portion, and in that the snap-fitting arm is of a plurality and the snap-fitting arms are arranged along the periphery of the engaging portion.

According to the present invention, since the lock member prevents an elastic deformation of the snap-fitting arm in the direction to release the engagement with the engagement portion, looseness of the integrated component can be suppressed. In a case where the lock member is attached to the engagement base at the temporary holding position in advance, an assembling work in the fuel tank in which the visualizing is difficult is easy.

According to the present invention, the snap-fitting structure which is simple and has a superior assemblage property is obtained.

The present invention is characterized in that the snap-fitting arms of three or more are arranged along the periphery of the engaging portion.

According to the present invention, since the integrated component can be engaged with and supported by the weld clip at three or more positions along the periphery of the weld clip, looseness of the integrated component can be furthermore suppressed.

The present invention is characterized in that each of the snap-fitting arms is prevented from being elastically deformed by holding a free end portion of the corresponding elastic arm by the lock member located at the lock position.

According to the present invention, since the free end portion of each elastic arm is held by the lock member, the corresponding snap-fitting arm is surely prevented from being elastically deformed with the simple structure.

The present invention is characterized in that the lock member includes a temporary holding release portion which allows the lock member to move the lock member to the lock position from the temporary holding position by pushing force of the weld clip.

According to the present invention, an assembling error such that the lock member is moved to the lock position before the weld clip is engaged with the engagement base can be prevented by the temporary holding release portion.

The present invention is characterized in that the lock member includes a first lock member and a second lock member which are attached to the engagement base while sliding inward in a radial direction from opposite positions across an axis of the engaging portion.

According to the present invention, since the lock member is formed of two members, the lock member can be easily and quickly operated.

The present invention is characterized in that the first lock member includes a temporary holding release portion which allows moving to the lock position from the temporary holding position of the first lock member by pushing force of the weld clip, and that the second lock member includes a second lock member temporary holding release portion which allows moving to the lock position from the temporary holding position of the second lock member by pushing force of the first lock member moving to the lock position from the temporary holding position.

According to the present invention, an assembling error such that the first lock member is moved to the lock position before the weld clip is engaged with the engagement base can be prevented by the temporary holding release portion.

Furthermore, since the lock member is stepwise locked, a working error can be reduced.

Furthermore, the present invention is characterized in that the mounting structure includes: a weld clip which has a tip part having an engaging portion and a base end part to be welded to an inner surface of the fuel tank; an engagement base which is provided to the integrated component to be integrated into the fuel tank, and has a snap-fitting arm to be engaged with the engaging portion by elastic restoring force; and a lock member which is attached to the engagement base so as to be capable of switching from a temporary holding position to a lock position, the temporary holding position allowing an elastic deformation of the snap-fitting arm in a direction to release an engagement with the engaging portion, the lock position preventing the elastic deformation, in that the snap-fitting arm includes an elastic arm which is extended along a periphery of the engaging portion and is capable of being elastically deformed in a radial direction of the engaging portion; and an engaged portion which is provided to the elastic arm and is engaged with the engaging portion, in that the snap-fitting arm is of a plurality and the snap-fitting arms are arranged along the periphery of the engaging portion, and in that each of the snap-fitting arms is prevented from being elastically deformed by holding a free end portion of the elastic arm by the lock member located at the lock position.

According to the present invention, since the free end portion of each elastic arm is held by the lock member, the corresponding snap-fitting arm can be surely prevented from being elastically deformed with the simple structure.

Effect of the Invention

According to the present invention, looseness of an integrated component mounted by snap-fitting on a fuel tank can be suppressed.

MODE FOR CARRYING OUT THE INVENTION

Figure 1:
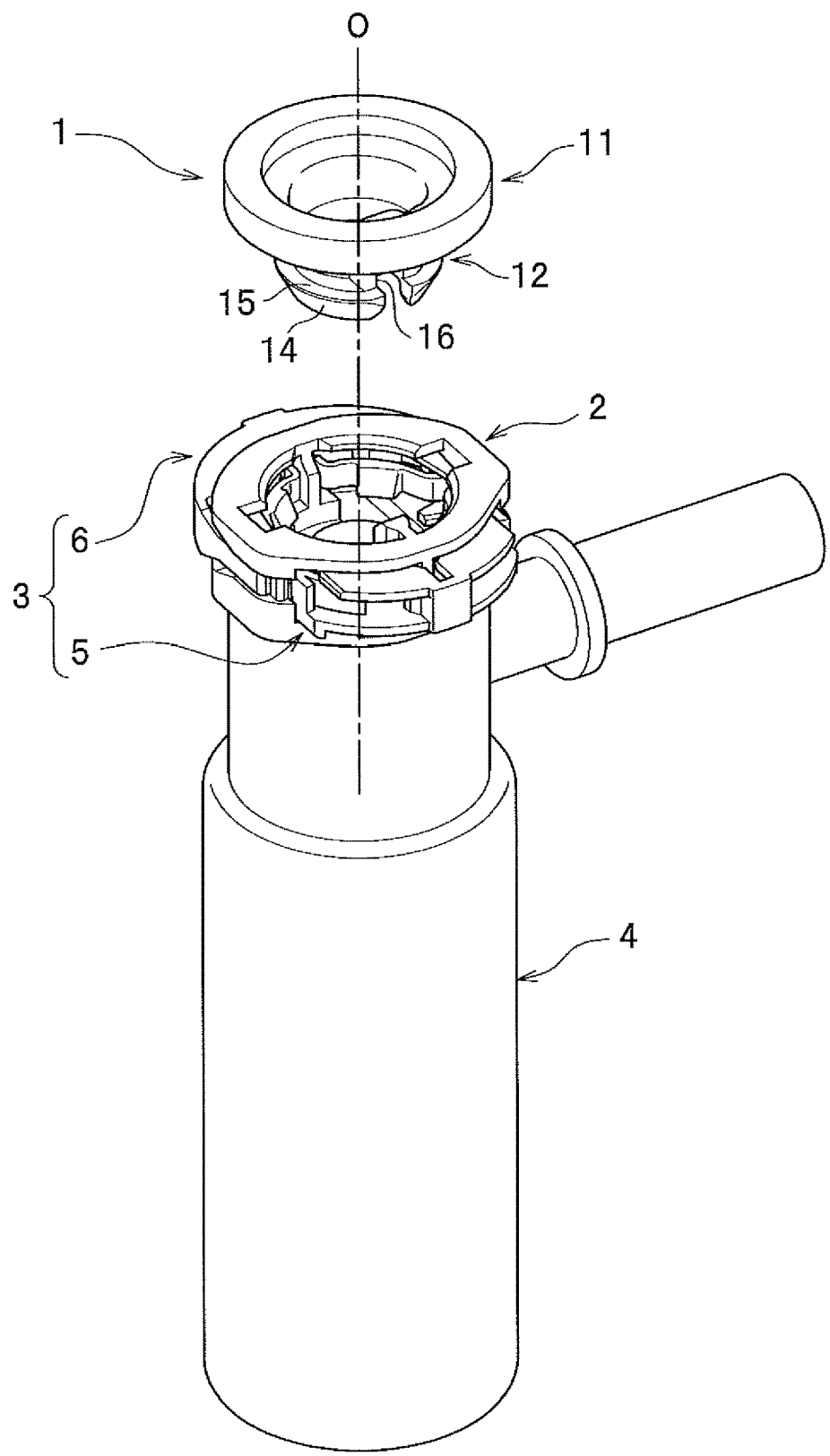
FIG. 1 is a perspective view showing an outward appearance of a mounting structure for an integrated component according to a present invention.

Hereinafter, an embodiment of the present invention will be described with reference to the drawings. A mounting structure for an integrated component of a fuel tank according to the embodiment includes a weld clip 1, an engagement base 2 and a lock member 3 as shown in FIG. 1.

<Weld Clip 1>

Figure 2:
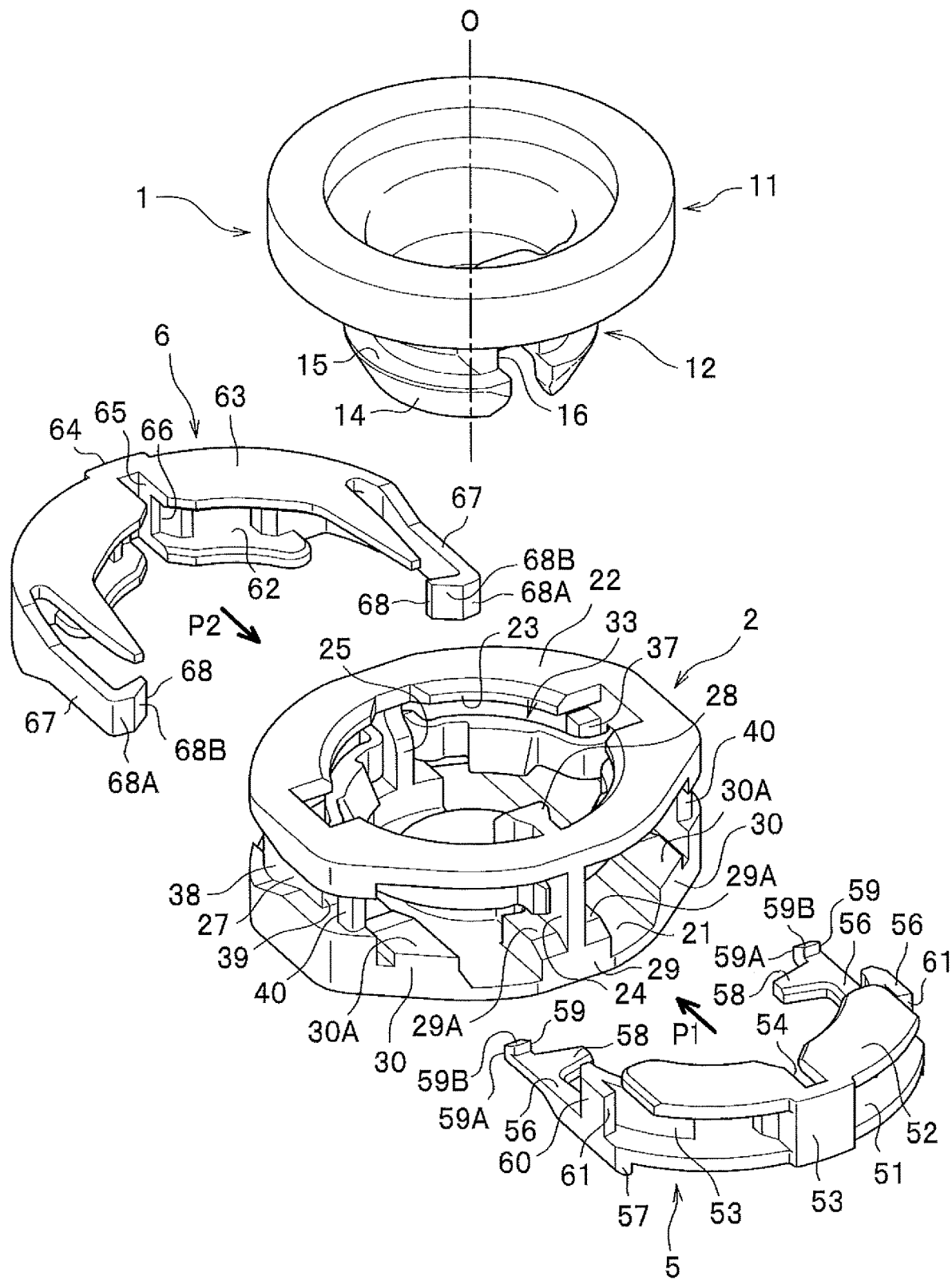
FIG. 2 is an exploded perspective view of the mounting structure for an integrated component according to the present invention.
Figure 8A:
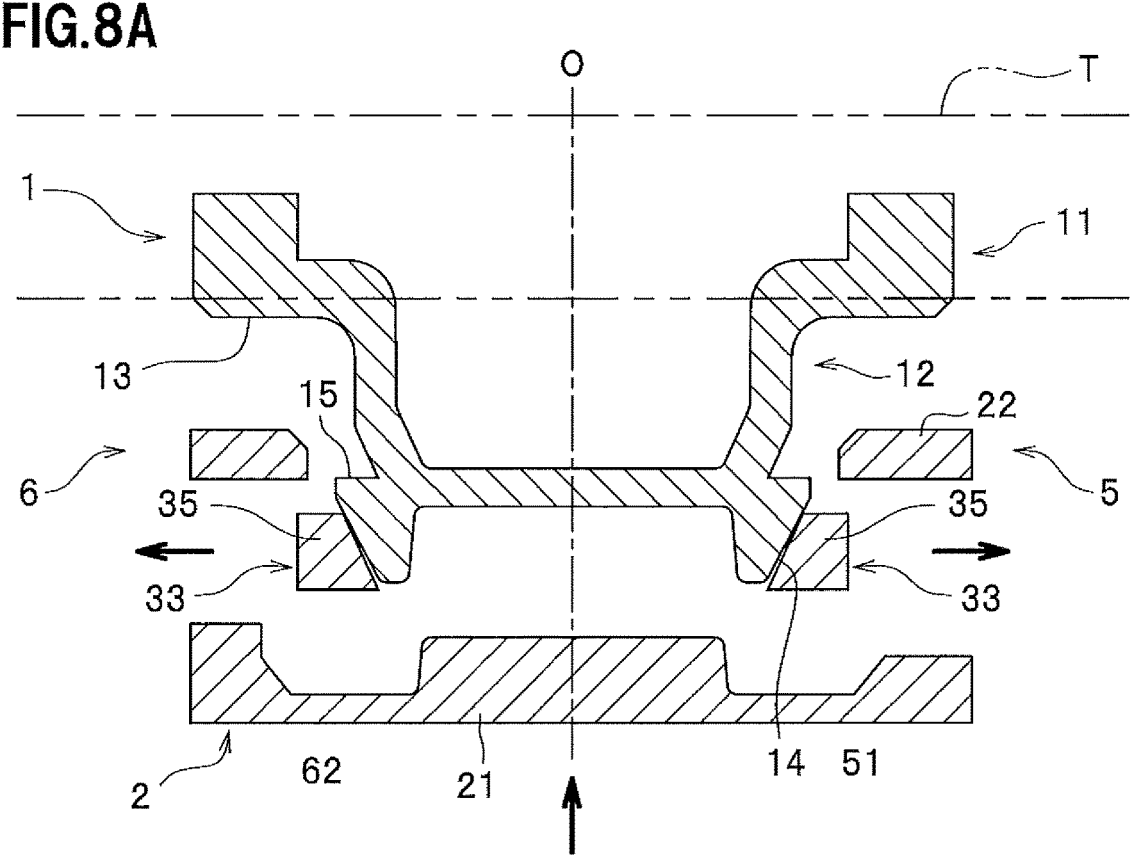
FIGS. 8A and 8B is a side view showing an engagement between an engaging portion of a weld clip and an engaged portion of the engagement base.
Figure 8B:
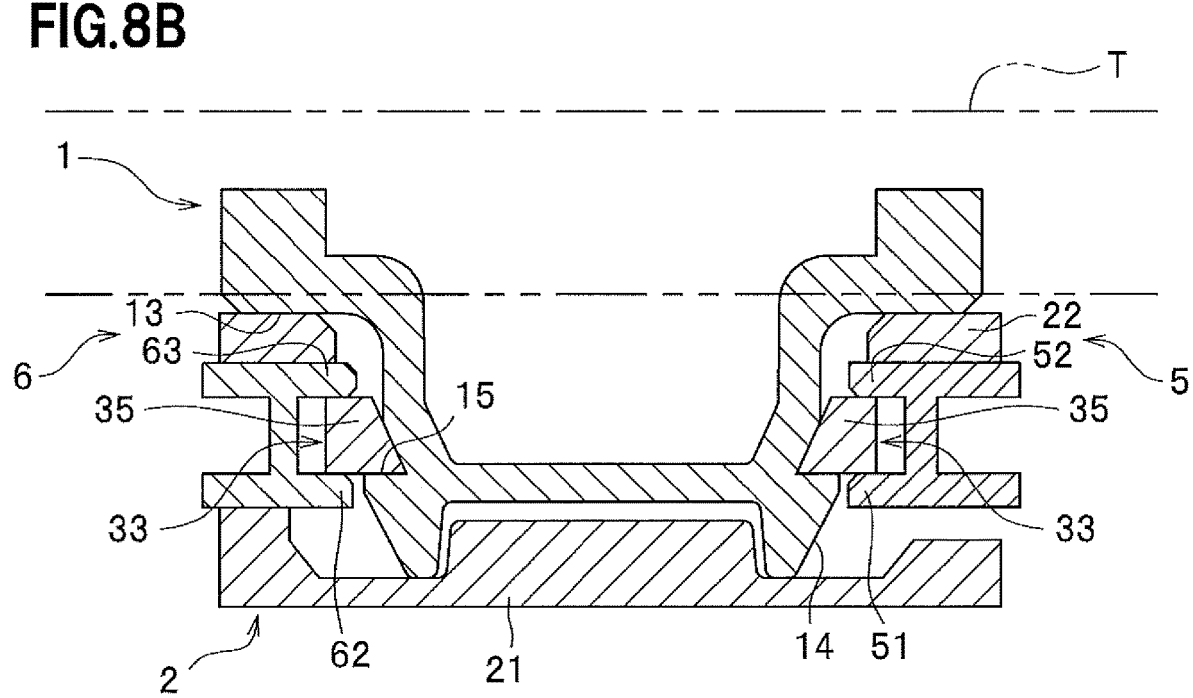

Referring to FIGS. 2 and 8, the weld clip 1 has an approximate cylindrical shape having a base end part of a large diameter part 11 and a tip part of a small diameter part 12. The base end part is on one end side and the tip part is on the other end side. And the weld clip 1 is approximately a hollow cylindrical member which is opened on the base end side. An annular step surface 13 is formed between the large diameter part 11 and the small diameter part 12. An inclined surface 14 is formed around an axis O of the weld clip 1 and at a periphery of the small diameter part 12 on the tip side. The inclined surface 14 has a larger diameter as it goes toward the large diameter part 11. Furthermore, an engaging portion 15 which is a step recessed portion is formed around the axis O and located on the base end side of the inclined surface 14. In this way, the small diameter part 12 located on the tip side of the weld clip 1 has an approximate mushroom shape. As shown in FIG. 2, a positioning groove 16 is formed at the periphery of the small diameter part 12 along the axis O from the tip of the small diameter part 12. This positioning groove 16 is engaged with a rib tip portion 28 of the engagement base 2 described later. The above-described weld clip 1 is fixed to the fuel tank T so that the weld clip 1 stands on an inner surface of the fuel tank by welding the large diameter part 11 to a wall of the fuel tank T to be embedded in the wall when the fuel tank T made of resin is molded (as shown in FIGS. 8A, 8B).

<Engagement Base 2>

As shown in FIG. 1, the engagement base 2 is provided to an upper part of an integrated component 4 to be integrated into the fuel tank T. The engagement base 2 may be integrally molded with the integrated component 4, or may be a separate component which is assembled to the integrated component 4. A valve is an example of the integrated component 4, but may be another component. A housing of the integrated component 4 of this embodiment has a cylindrical shape, and the engagement base 2 is formed so that the engagement base 2 has an approximately cylindrical and flat shape assembled to the upper part of the housing of the integrated component 4.

Referring to FIGS. 2 to 4 and 5A, a bottom plate portion 21 is formed on a lower part of the engagement base 2. The bottom plate portion 21 is separated from the integrated component 4 and has an approximate disk shape. A flange portion 22 is formed on the upper part of the engagement base 2, and extends inward in a radial direction from the periphery of the upper part, so that an opening 23 is formed in the central area of the upper part. The small diameter part 12 of the weld clip 1 is inserted through the opening 23. When the weld clip 1 and the engagement base 2 are engaged with each other, the step surface 13 approximately comes into contact with the flange 22, so that an engaged posture of the weld clip 1 and the engagement base 2 is stable.

Figure 5A:
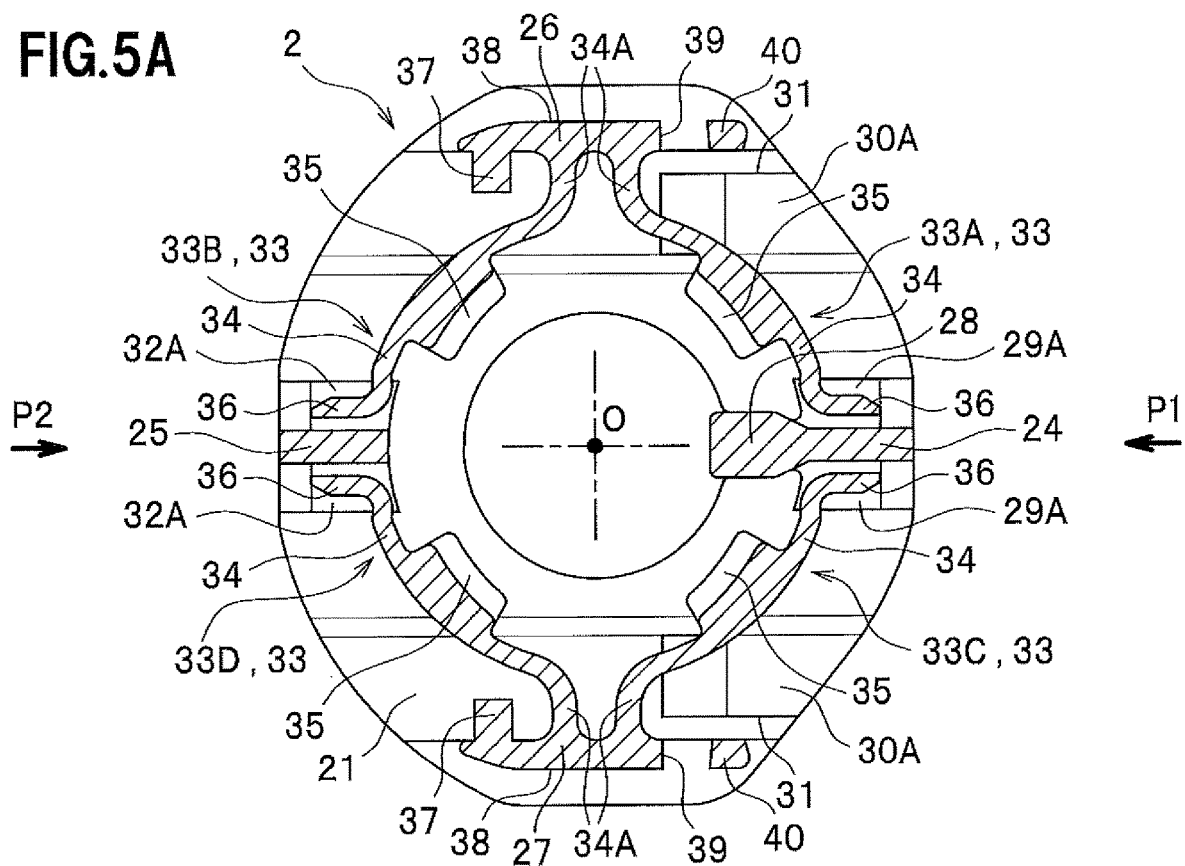
FIG. 5A is a sectional plan view of the engagement base.

As shown in FIGS. 2 and 5A, the flange portion 22 and the bottom plate portion 21 are connected with a first rib 24, a second rib 25, a first peripheral wall portion 26 and a second peripheral wall portion 27, and these portions are arranged every 90 degrees around the axis O. The first rib 24 and the second rib 25 are located opposite to each other across the axis O. The first peripheral wall portion 26 and the second peripheral wall portion 27 are located opposite to each other across the axis O. Each of the first rib 24 and the second rib 25 is a plate portion having an approximate rectangular shape viewed from the side in a radial direction including the axis O. The first rib 24 is engaged with an engagement groove 54 of a first lock member 5 sliding in a slide direction P1, and the second rib 25 is engaged with an engagement groove 65 of a second lock member 6 sliding in a slide direction P2. The slide direction P1 is a direction orthogonal to the axis O, and the slide direction P2 is a direction opposite to the slide direction P1. A rib inner tip portion 28 of the first rib 24 inside in the radial direction is nearer to the axis O than a rib inner tip portion of the second rib 25 inside in the radial direction, and is engaged with the positioning groove 16 of the weld clip 1 as described in the above.

Slide guide portions 29, 29 are formed on the base portion of the first rib 24, the base portion being on the bottom plate portion 21 side. An upper surface of each slide guide portion 29 is a plane orthogonal to the axis O, and a guide surface 29A to come into contact with a lower plate portion 51 of the first lock member 5. Furthermore, slide guide portions 30 are respectively formed in the vicinity of the base portion of the first peripheral wall portion 26 on the bottom plate portion 21 side and in the vicinity of the base portion of the second peripheral wall portion 27 on the bottom plate portion 21 side. An upper surface of each slide guide portion 30 is a plane orthogonal to the axis O, and a guide surface 30A to come into contact with the lower plate portion 51 of the first lock member 5.

Figure 3:
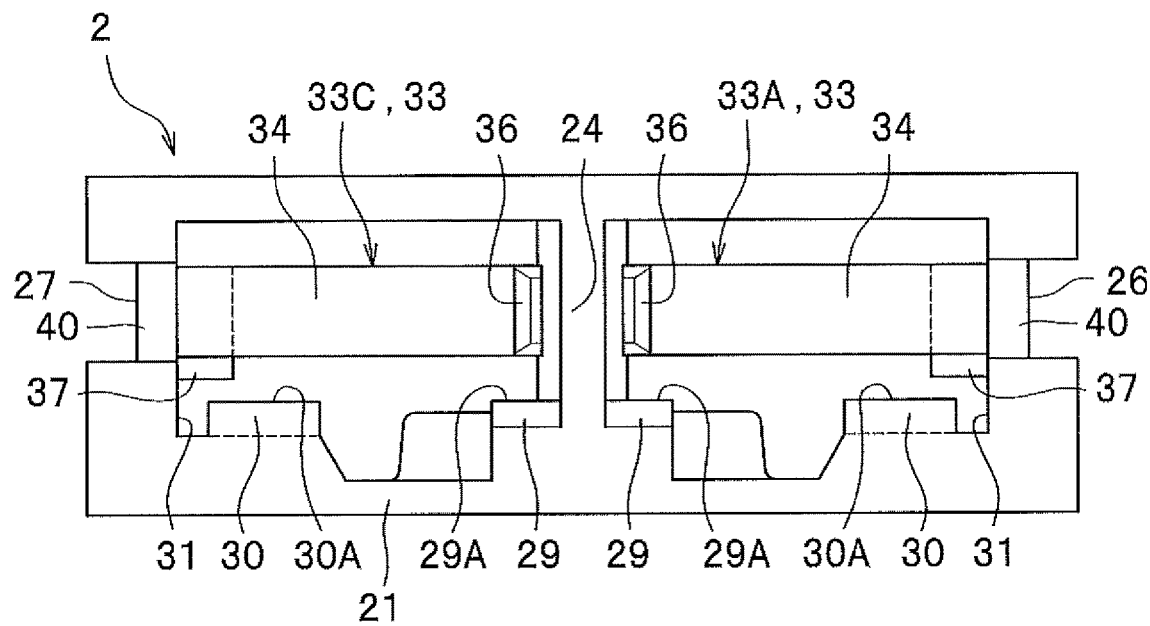
FIG. 3 is a side view of an engagement base according to the present invention viewed from an attaching side of a first lock member.
Figure 4:
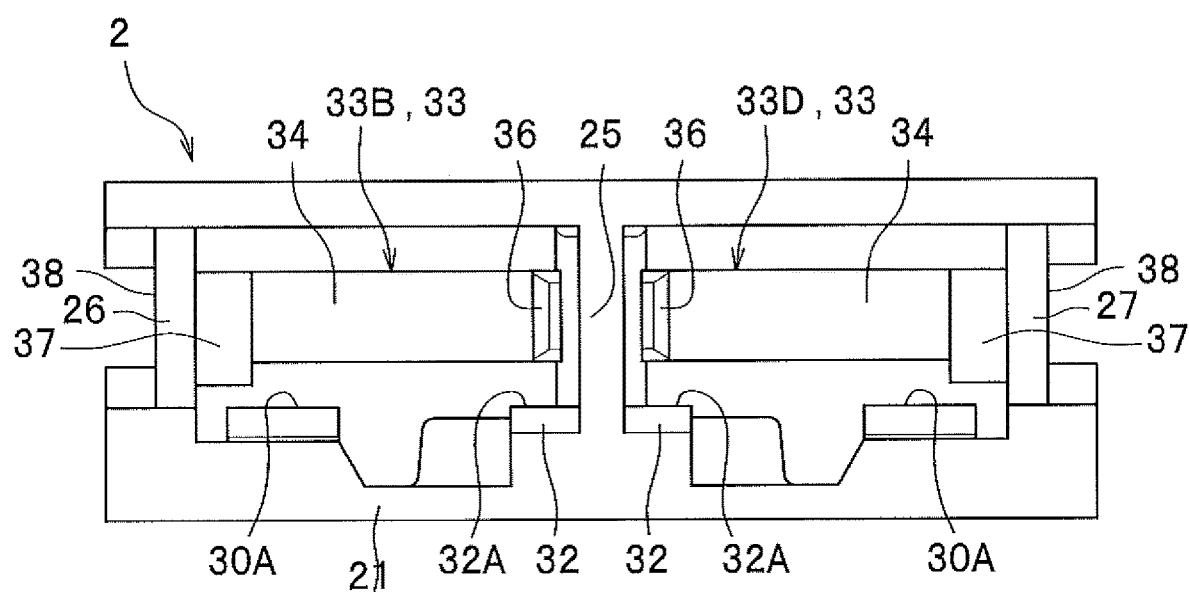
FIG. 4 is a side view of the engagement base according to the present invention viewed from an attaching side of a second lock member.

As shown in FIG. 3, slide guide grooves 31 parallel with the slide direction P1 are formed respectively between the first peripheral wall portion 26 and the slide guide portion 30 and between the second peripheral wall portion 27 and the slide guide portion 30. Each guide groove 31 is engaged with a guide rib 57 of the first lock member 5 to guide the first lock member 5 so as to slide along the guide groove 31. As shown in FIG. 4, slide guide portions 32, 32 are also formed on the base portion of the second rib 25, the base portion being on the bottom plate portion 21 side. An upper surface of each slide guide portion 32 is a plane orthogonal to the axis O, and a guide surface 32A to come into contact with a lower plate portion 62 of the second lock member 6.

<Snap-Fitting Arm 33>

A snap-fitting arm 33 is formed on each inner surface of the first and second peripheral wall portions 26, 27. The snap-fitting arm 33 is engaged with the engaging portion 15 of the weld clip 1 by elastic restoring force. The plural snap-fitting arms 33 are arranged along the periphery of the engaging portion 15. As shown in FIG. 5A, four snap-fitting arms 33A to 33D are arranged in this embodiment. Each of the snap-fitting arms 33A and 33B has a cantilever structure supported by the first peripheral wall portion 26, and each of the snap-fitting arms 33C and 33D has a cantilever structure supported by the second peripheral wall portion 27.

The snap-fitting arms 33A to 33D are extended along the periphery of the engaging portion 15, and each arm includes an elastic arm 34 which can be elastically deformed in the radial direction of the engaging portion 15, and an engaged portion 35 which is provided to the elastic arm 34 and engaged with the engaging portion 15. Each elastic arm 34 is a belt plate like arm which is along the axis O and is extended along the periphery of the engaging portion 15 to have a length of about ¼ of the periphery length of the engaging portion 15. The base end portion 34A of each elastic arm 34 is curved so that the elastic arm 34 can be elastically deformed in the radial direction, and integrated with the inner surface of the first peripheral wall portion 26 or of the second peripheral wall portion 27. The engaged portion 35 to be engaged with the engaging portion 15 has a claw shape and is provided at a middle part in the circumferential direction of each elastic arm 34.

Free end portions of the elastic arms 34 of the snap-fitting arms 33A and 33C are located at respective sides of the first rib 24, and free end portions of the elastic arms 34 of the snap-fitting arms 33B and 33D are located at respective sides of the second rib 25. An end zone of each elastic arm 34 has a regulating plate portion 36 which is extended in the slide direction P1 or P2.

Figure 7A:
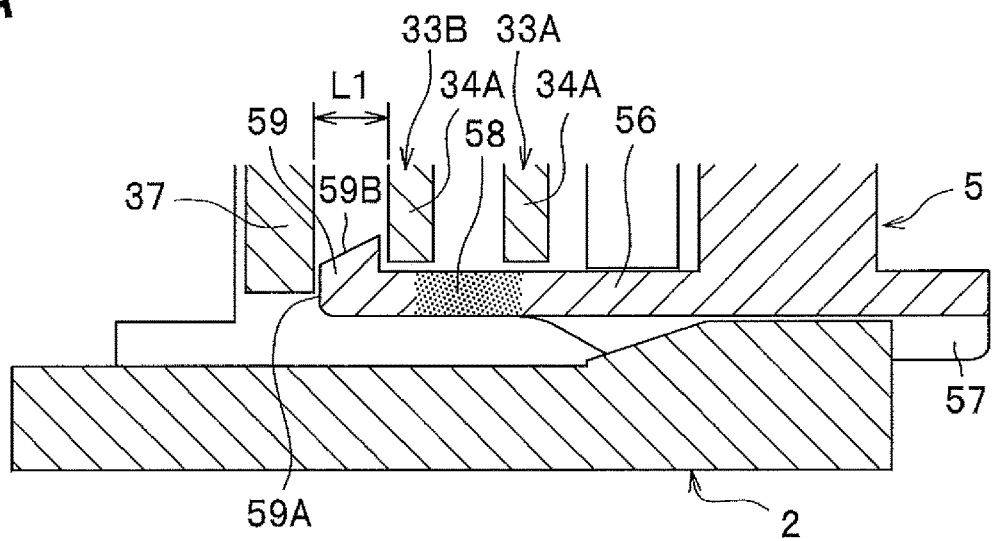
FIGS. 7A, 7B, and 7C are side views for explaining actions of a first engaging hook.
Figure 7B:
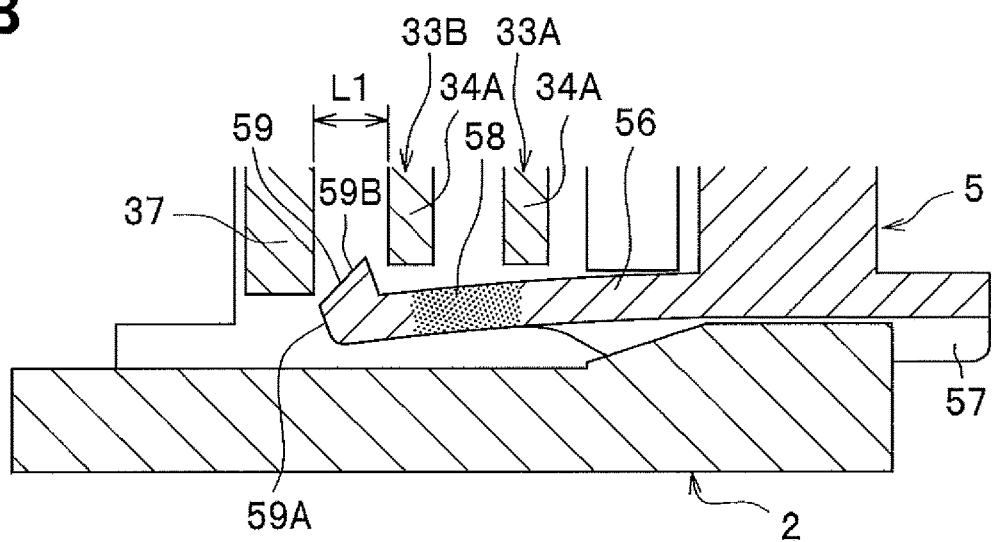
Figure 7C:
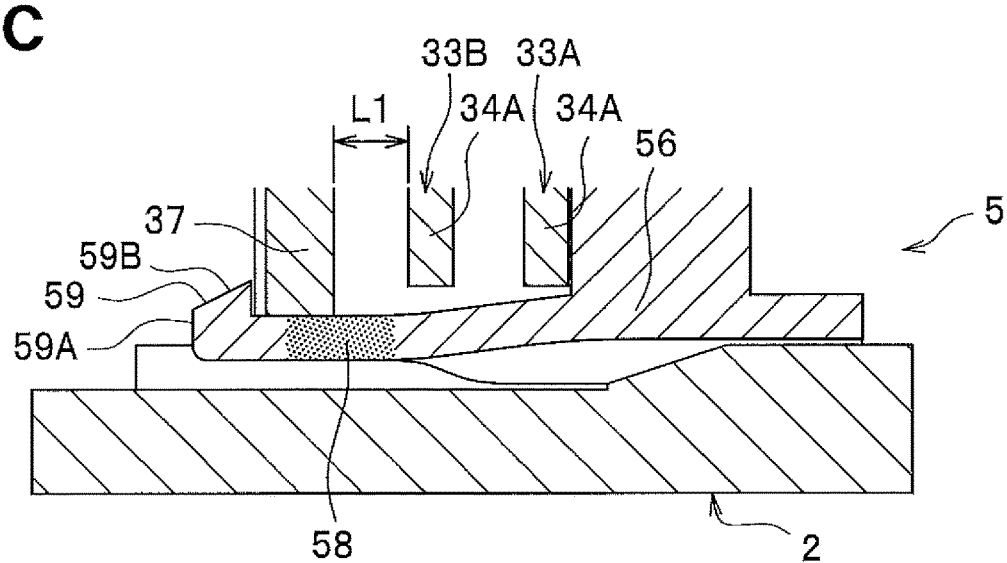

A first stopper 37 is provided on the inner surface of the first peripheral wall portion 26 at a position separated by the distance L1 (refer to FIGS. 7A, 7B, 7C) in the slide direction P1 from the base end portion 34A of the elastic arm 34 of the snap-fitting arm 33B. As shown in FIGS. 7A, 7B, 7C, an lower end of the first stopper 37 is located at a lower position than the lower end of the base end portion 34A. As will be mentioned later, unless a temporary holding release portion 58 is pushed by the weld clip 1, in a case where the first stopper 37 comes into contact with a first engaging hook 59 of the first lock member 5, the first lock member 5 is prevented from sliding to a lock position S2 from a temporary holding position S1. As shown in FIG. 5A, the similar first stopper 37 is provided also on the inner surface of the second peripheral wall portion 27 at a position separated by the distance L1 (refer to FIGS. 7A, 7B, 7C) from the base end portion 34A of the elastic arm 34 of the snap-fitting arm 33D.

As shown in FIGS. 2, 5A, each outer surface of the first peripheral wall portion 26 and the second peripheral wall portion 27 has a plane guide surface 38 which is parallel with the slide direction P2 and comes into contact with the corresponding inner surface of engaging arms 67 of the second lock member 6. A rectangular engagement hole 39 for engaging with the corresponding one of second engaging hooks 68 is formed at an end portion of each guide surface 38 in the slide direction P2, the hole 39 being passed through the first peripheral wall portion 26 or the second peripheral wall portion 27. As shown in FIG. 5A, each engagement hole 39 is located at a position separated away in the slide direction P2 from the base end portion 34A of the corresponding elastic arm 34 of the snap-fitting arms 33A, 33C. A vertical peripheral wall of the engagement hole 39 on the far side in the slide direction P2 is a second stopper 40. As will be mentioned later, unless the first lock member 5 moves to the lock position S2, in a case where the second stopper 40 comes into contact with the second engaging hook 68, the second lock member 6 is prevented from moving to a lock position T2 from a temporary holding position T1.

<Lock Member 3>

Figure 5B:
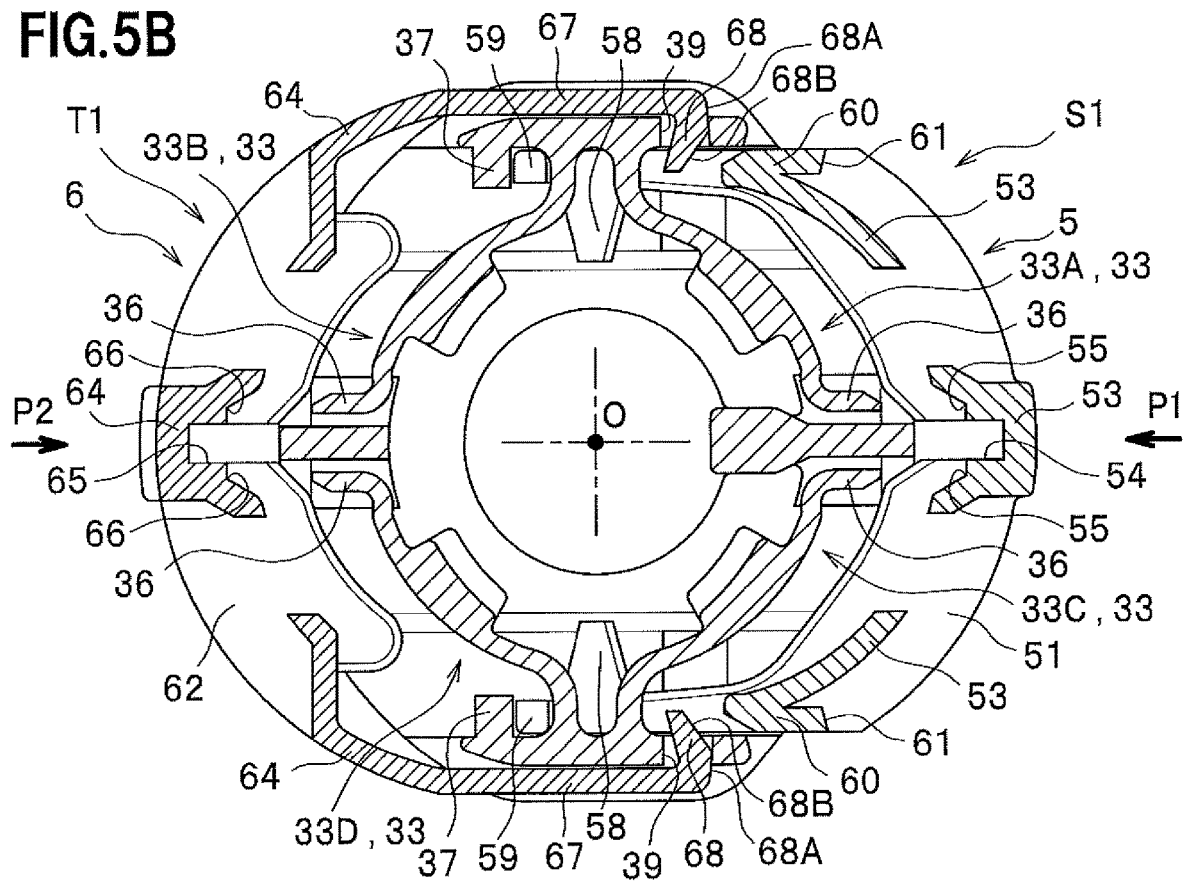
FIG. 5B is a sectional plan view of the engagement base with the first and second lock members attached to the engagement base at temporary holding positions.

Referring to FIGS. 2, 5B, 6, regarding an elastic deformation of the snap-fitting arm 33 in a direction where an engagement between the lock member 3 and the engaging portion 15 of the weld clip 1 is released, that is, regarding an elastic deformation of the snap-fitting arm 33 in an outward direction of a radial direction passing through the axis O, the lock member 3 is attached to the engagement base 2 so that the lock member 33 can be switched to the lock position which regulates the deformation from the temporary holding position which allows it. The lock member 3 is composed of the lock member 5 attached to the engagement base 2 so as to be slidable in the slide direction P1 and the lock member 6 attached to the engagement base 2 so as to be slidable in the slide direction P2. The slide direction P1 and the slide direction P2 are opposite to each other across the axis O.

<First Lock Member 5>

The first lock member 5 has an approximate half-cylindrical shape, and includes the lower plate portion 51 having an approximate half-annular shape, an upper plate portion 52 having an approximate half-annular shape and a peripheral wall portion 53. The lower plate portion 51 and the upper plate portion 52 are provided with respective grooves 54 for being engaged with the first rib 24 of the engagement base 2. A regulating wall portion 55 (refer to FIG. 5B) is formed on an inner surface of the peripheral wall portion 53. The regulating wall portion 55 comes into contact with the regulating plate portions 36 of the elastic arms 34 of the snap-fitting arms 33A and 33C when the first lock member 5 is located at the lock position S2.

As shown in FIG. 2, a pair of release arms 56 extended in the slide direction P1 are provided on respective sides of the lower plate portion 51. The release arms 56 can be elastically deformed in an upper-lower direction. Guide ribs 57 are provided on respective lower surfaces of the release arms 56. The guide ribs 57 are engaged with respective slide guide grooves 31 of the engagement base 2. As shown in FIG. 5B, each release arm 56 is located under the snap-fitting arm 33 and outside the snap-fitting arm 33 in the radial direction not to interfere with the engaging portion 15 of the weld clip 1. However, each temporary holding release portion 58 having a tongue shape is provided at a position near the tip of the corresponding release arm 56. Each temporary holding release portion 58 projects inside the snap-fitting arm 33 in the radial direction. Each temporary holding release portion 58 is pushed downward by the weld clip 1, so that the first lock member 5 can be moved to the lock position S2 from the temporary holding position S1. As shown in FIG. 2, the first engaging hooks 59 are provided at respective tips of the release arms 56. Each first engaging hook 59 is a claw portion protruding upward. Each first engaging hook 59 is provided with an end surface 59A formed at the front end thereof and an inclined surface 59B inclined up to an engaging portion from the end surface 59A.

Release walls 60 stand on respective upper surfaces of the release arms 56, and extended in the slide direction P1. Each release wall 60 is for pushing the corresponding second engaging hook 68 of the second lock member 6 outward in the radial direction. One end portion of each release wall 60 is formed as an engaging portion 61 for engaging with the corresponding second engaging hook 68 when the second lock member 6 is located at the lock position T2.

<Second Lock Member 6>

As shown in FIG. 2, the second lock member 6 has an approximate half-cylindrical shape, and includes a lower plate portion 62 having an approximate half-annular shape, an upper plate portion 63 having an approximate half-annular shape and a peripheral wall portion 64. The lower plate portion 62 and the upper plate portion 63 are provided with respective grooves 65 for being engaged with the second rib 25 of the engagement base 2. A regulating wall portion 66 is formed on an inner surface of the peripheral wall portion 64. The regulating wall portion 66 comes into contact with the regulating plate portions 36 of the elastic arms 34 of the snap-fitting arms 33B and 33D when the second lock member 6 is located at the lock position T2.

A pair of engaging arms 67 extended in the slide direction P2 are provided on respective sides of the peripheral wall portion 64. Each engaging arm 67 can be elastically deformed in the radial direction passing through the axis O. A second engaging hook 68 (second lock member temporary holding release portion) is provided at the front end of each engaging arm 67. Each second engaging hook 68 is a claw portion projecting inward in the radial direction passing through the axis O. Each second engaging hook 68 is provided with an end surface 68A formed at the front end thereof and an inclined surface 68B inclined up to an engaging portion from the end surface 68A.

<Operation>
<Operation at the time of temporary holding of the first lock member 5 and the second lock member 6>

The work for temporarily holding the first lock member 5 and the second lock member 6 to the engagement base 2 is done before assembling to the fuel tank T. As shown in FIG. 2, when the first lock member 5 is inserted into the engagement base 2 in the slide direction P1, the first lock member 5 slides while the guide ribs 57 are being guided by the slide guide grooves 31 and the lower surfaces of the release arms 56 are being in contact with the guide surfaces 30A of the slide guide portions 30. When the release arms 56 move under the snap-fitting arms 33, each first engaging hook 59 comes into contact with the base end portion 34A of the corresponding elastic arm 34. In more detail, the inclined surface 59B of each first engaging hook 59 comes into contact with the corresponding base end portion 34A. Thereby, each release arm 56 is elastically deformed downward by the reaction force from the corresponding base end portion 34A, so that each first engaging hook 59 can pass under the base end portion 34A of the corresponding snap-fitting arm 33.

FIG. 7A shows the state in which the first engaging hook 59 has passed the base end portions 34A of two snap-fitting arms 33. Even when the first lock member 5 is further pushed in the slide direction P1 from that state, the end surface 59A of each first engaging hook 59 comes into contact with the side surface of the corresponding first stopper 37. Therefore, the first lock member 5 is prevented from sliding further in the slide direction P1. Furthermore, each first engaging hook 59 is engaged with the corresponding base end portion 34A of the snap-fitting arms 33B, 33D, so that the first lock member 5 is also prevented from sliding in the reverse direction of the slide direction P1. That is, the first lock member 5 is prevented also from leaving the engagement base 2. Thus, a state in which each first engaging hook 59 is located between the corresponding first stopper 37 and the corresponding base end portion 34A of the snap-fitting arms 33B, 33D is a state in which the first lock member 5 is located at the temporary holding position S1. At the temporary holding position S1, the lower plate portion 51 comes into contact with the guide surfaces 30A, and the upper plate portion 52 comes into contact with the lower surface of the flange portion 22. Thereby, the first lock member 5 is also prevented from being vertically rattled relative to the engagement base 2.

At the temporary holding position S1, as shown in FIG. 5B, each temporary holding release portion 58 is located so as to protrude inward in the radial direction more than the corresponding snap-fitting arm 33. At the temporary holding position S1, the regulating plate portions 36 of the snap-fitting arms 33A, 33C are not yet in contact with the regulating wall portions 55. Therefore, elastic deformations of the snap-fitting arms 33A, 33C are allowed, the direction of the elastic deformations being a direction in which the engagement with the engaging portion 15 is released, that is, the outward direction of the radial direction passing through the axis O.

Next, as shown in FIG. 2, when the second lock member 6 is inserted into the engagement base 2 in the slide direction P2, the second engaging hooks 68 are pushed by the guide surfaces 38 of the first peripheral wall portion 26 and the second peripheral wall portion 27. Thereby, the second lock member 6 slides while the engaging arms 67 are elastically deformed outward in the radial direction. When the second engaging hooks 68 reach ends of respective guide surfaces 38, as shown in FIG. 5B, each second engaging hook 68 is engaged with the corresponding engagement hole 39. Even when the second lock member 6 is further pushed in the slide direction P2 from that state, the end surface 68A of each second engaging hook 68 comes into contact with the side surface of the corresponding second stopper 40. Therefore, the second lock member 6 is prevented from sliding further in the slide direction P2. Furthermore, the second engaging hooks 68 are engaged with the respective engagement holes 39, so that the second lock member 6 is also prevented from sliding in the reverse direction of the slide direction P2. That is, the second lock member 6 is also prevented from leaving the engagement base 2. Thus, a state in which the second engaging hooks 68 are engaged with the respective engagement holes 39 is the state in which the second lock member 6 is located at the temporary holding position T1.

At the temporary holding position T1, the lower plate portion 62 is in contact with the guide surfaces 32A, and the upper plate portion 63 is in contact with the lower surface of the flange portion 22. Thereby, the second lock member 6 is also prevented from being vertically rattled relative to the engagement base 2. As shown in FIG. 5B, at the temporary holding position T1, the regulating plate portions 36 of the snap-fitting arms 33B, 33D are not yet in contact with the regulating wall portions 66. Therefore, elastic deformations of the snap-fitting arms 33B, 33D are allowed, the direction of the elastic deformations being a direction in which the engagement with the engaging portion 15 is released, that is, the outward direction of the radial direction passing through the axis O.

Note that, regarding the work for temporarily holding the first lock member 5 and the second lock member 6 to the engagement base 2, the second lock member 6 may be done earlier <Operation at the time of mounting the integrated component 4>

Next, an operation at the time of mounting the integrated component 4 to the weld clip 1 welded to the fuel tank T will be described. At this time, the engagement base 2 has been already attached to the integrated component 4, and the first lock member 5 and the second lock member 6 have been temporarily held to the engagement base 2. A worker does his work in a state where his hand is inserted in the fuel tank T through an opening (for example, an opening for mounting the fuel pump). The worker inserts the weld clip 1 into the opening 23 of the engagement base 2 while the angular phase of the rib inner tip portion 28 is matched with that of the positioning groove 16, and then pushes the integrated component 4 against the weld clip 1 along the axis O. Thereby, as shown in FIG. 8A, each snap-fitting arm 33 is elastically deformed outward in the radial direction because of the reaction force which the corresponding engaged portion 35 receives from the inclined surface 14 of the weld clip 1. When each engaged portion 35 reaches the engaging portion 15, the engaged portion 35 is engaged with the engaging portion 15 by the elastic restoring force of the corresponding snap-fitting arm 33 in the radial inward direction as shown in FIG. 8B.

Since the rib inner tip portion 28 is engaged with the positioning groove 16, the angular position around the axis O of the integrated component 4 is also fixed. Furthermore, since the step surface 13 of the weld clip 1 comes into contact with the upper surface of the flange portion 22 of the engagement base 2, an attached posture of the integrated component 4 to the weld clip 1 is stable. In the state where the engaged portions 35 are engaged with the engaging portion 15, the release arms 56 of the first lock member 5 are elastically deformed downward by the reaction force which the temporary holding release portions 58 receive from the inclined surface 14 being in contact with the temporary holding release portions 58 as shown in FIG. 7B. In this state, since the end surface 59A of each first engaging hook 59 is lowered than the lower surface of the corresponding first stopper 37, the first lock member 5 can slide in the slide direction P1.

Next, the worker sandwiches the first lock member 5 and the second lock member 6 which are in a temporary holding state, for example, with his forefinger and thumb, and then pushes the first lock member 5 and the second lock member 6 into the engagement base 2 with emphasized both fingers. The second lock member 6 cannot slide since the end surface 68A of each second engaging hook 68 is still in contact with the stopper 40. On the other hand, regarding the first lock member 5, since the end surface 59A of each first engaging hook 59 is lowered than the lower end of the corresponding first stopper 37, at first, the first lock member 5 slides in the slide direction P1. Thereby, each first engaging hook 59 is engaged with the corresponding first stopper 37 as shown in FIG. 7C. This state is a state where the first lock member 5 is located at the lock position S2 as shown in FIG. 6A.

Figure 6A:
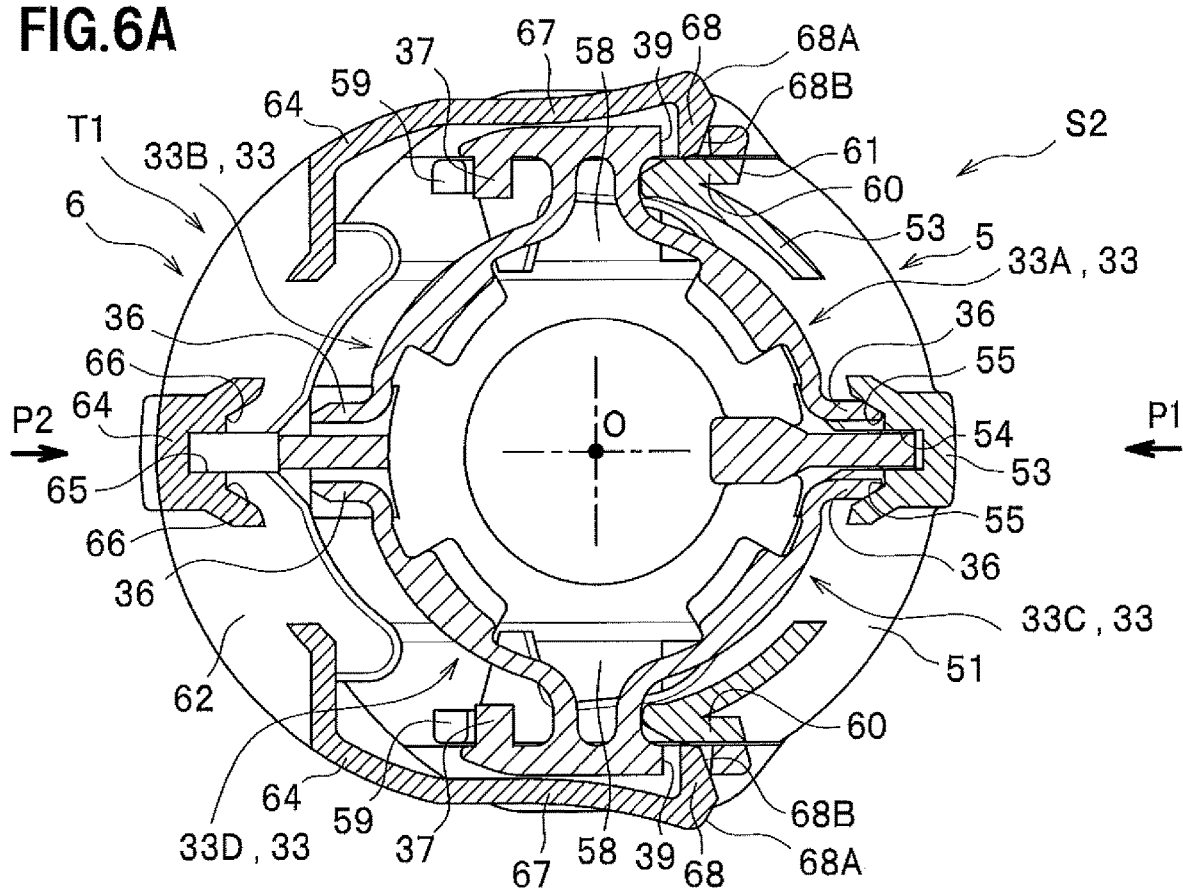
FIG. 6A is a sectional plan view of the engagement base with the first lock member attached to the engagement base at a lock position, and with the second lock member attached to the engagement base at the temporary holding position.

In the middle of the way that the first lock member 5 moves to the lock position S2 from the temporary holding position S1 while sliding, as shown in FIG. 6A, each release wall 60 of the first lock member 5 pushes the corresponding second engaging hook 68 outward in the radial direction. Thereby, each engaging arm 67 is elastically deformed, so that the end surface 68A lefts the corresponding second stopper 40 outward. Consequently, the second lock member 6 slides in the slide direction P2, so that each second engaging hook 68 is engaged with the corresponding engaging portion 61. That is, the first lock member 5 and the second lock member 6 are engaged with each other so that they are prevented from moving in directions in which they are separated away from each other. This state is a state where the second lock member 6 is located at the lock position T2 as shown in FIG. 6B.

Figure 6B:
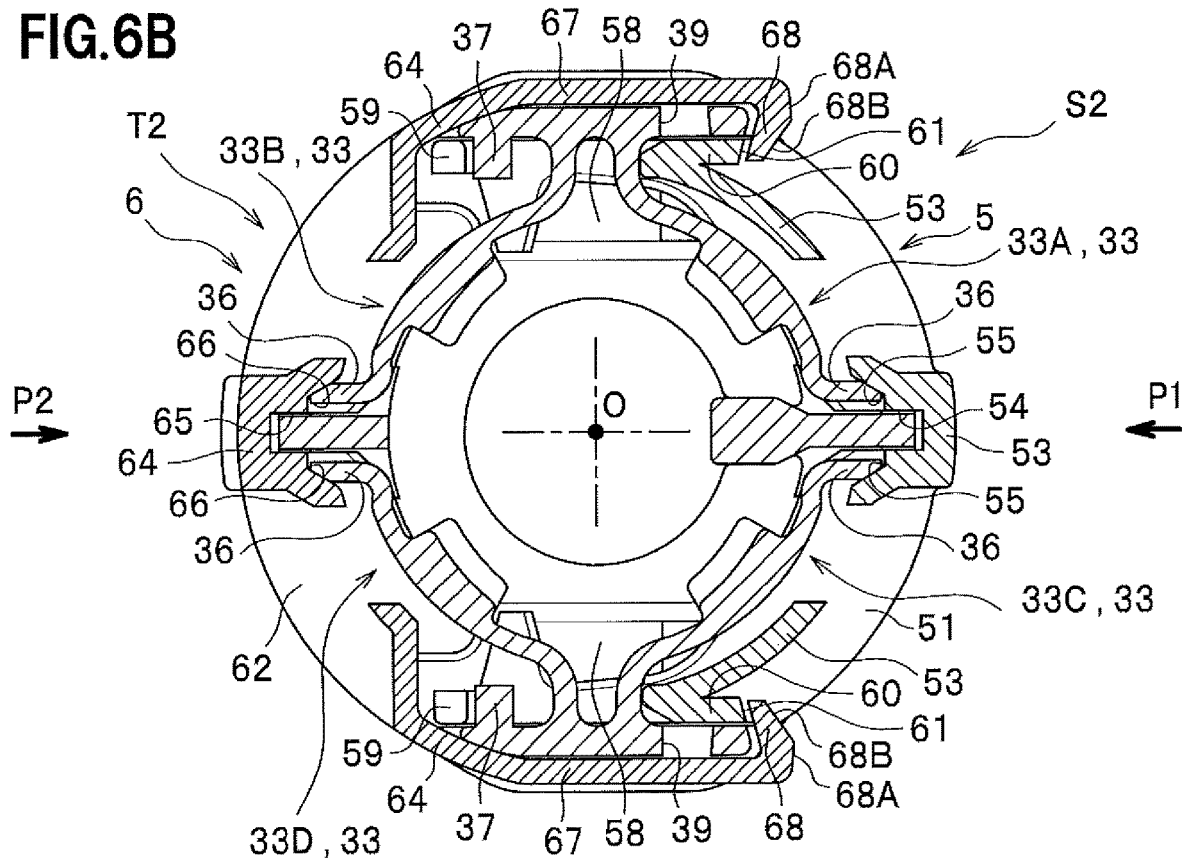
FIG. 6B is a sectional plan view of the engagement base with the first and second lock members attached to the engagement base at the lock position and a lock position, respectively.

As shown in FIG. 6B, since the regulating plate portions 36 of the snap-fitting arms 33A, 33C, the regulating plate portions 36 being free end portions, are in contact with the regulating wall portions 55 of the first lock member 5, the snap-fitting arms 33A, 33C are prevented from being elastically deformed outward in the radial direction. Since the regulating plate portions 36 of the snap-fitting arms 33B, 33D, the regulating plate portions 36 being free end portions, are in contact with the regulating wall portions 66 of the second lock member 6, the snap-fitting arms 33A, 33C are prevented from being elastically deformed outward in the radial direction. As shown in FIG. 8B, since each snap-fitting arm 33 is sandwiched in the vertical direction with the lower plate portion 51 and the upper plate portion 52 of the first lock member 5 or the lower plate portion 62 and the upper plate portion 63 of the second lock member 6, there is no looseness in the vertical direction.

Advantageous Effects

As mentioned above, in a case of the structure which includes a weld clip 1 which has a tip portion having an engaging portion 15 and a base end portion to be welded to an inner surface of a fuel tank T; an engagement base 2 which is provided to an integrated component 4 to be integrated into the fuel tank T, and has a snap-fitting arm 33 to be engaged with the engaging portion 15 by elastic restoring force; and a lock member 3 which is attached to the engagement base 2 so as to be capable of switching a temporary holding position S1, T1 to a lock position S2, T2, the temporary holding position allowing an elastic deformation of the snap-fitting arm 33 in a direction to release the engagement with the engaging portion 15, the lock position preventing the elastic deformation, the following effects are served.

Since the elastic deformation of the snap-fitting arm 33 can be prevented by the lock member 3, the deformation being in the direction where the engagement with the engaging portion 15 is released, looseness of the integrated component 4 is suppressed. In a case where the lock member 3 is attached to the engagement base 2 at the temporary holding position S1, T1 in advance, an assembling work in the fuel tank in which the visualizing is difficult is easy.

In the next structure, each snap-fitting arm 33 includes an elastic arm 34 which is extended along the periphery of the engaging portion 15 and is capable of being elastically deformed in the radial direction of the engaging portion 15; and the engaged portion 35 which is provided to the elastic arm 34 and is engaged with the engaging portion 15, and a plurality of snap-fitting arms 33 are arranged along the periphery of the engaging portion 15. This structure is a snap-fitting engagement structure having a simple structure and a superior assemblage property.

In particular, in a case where three or more snap-fitting arms 33 are arranged along the periphery of the engaging portion 15 (in this embodiment, four snap-fitting arms 33A to 33D), the integrated component 4 can be engaged with the weld clip 1 while being supported with three or more points in the peripheral direction. Consequently, looseness of the integrated component 4 can be further suppressed.

In a case where the free end portion (regulating plate portion 36) of the elastic arm 34 of the snap-fitting arm 33 is held by the lock member 3 located at the lock position S2, T2 so that elastic deformation is prevented, the elastic deformation of the snap-fitting arm 33 can be surely prevented by the simple structure.

In a case where the lock member 3 includes the temporary holding release portion 58 which allows the lock member to move to the lock position S2 from the temporary holding position S1 by pushing force of the weld clip 1, an assembling error such that the lock member 3 is moved to the lock position S2 before the weld clip 1 is engaged with the engagement base 2 can be prevented.

In a case where the lock member 3 is formed of the first lock member 5 and the second lock member 6 which are capable of being attached to the engagement base 2 while sliding inward in the radial direction from the opposite positions across the axis O of the engaging portion 15, operations of the lock member 3 can be easily and quickly done.

In a case where the first lock member 5 includes the temporary holding release portion 58 which allows moving to the lock position S2 from the temporary holding position S1 of the first lock member 5 by pushing force of the weld clip 1, and the second lock member 6 includes a second lock member temporary holding release portion (second engaging hook 68) which allows moving to the lock position T2 from the temporary holding position T1 of the second lock member 6 by pushing force of the first lock member 5 moving to the lock position S2 from the temporary holding position S1, the following effects are served.

(1) An assembling error such that the first lock member 5 is moved to the lock position S2 before the weld clip 1 is engaged with the engagement base 2, can be prevented by the temporary holding release portion 58.

(2) If the first lock member 5 and the second lock member 6 are formed so that they are individually capable of moving to the lock position S2, T2, a working error such that only one lock member reaches the lock position is easily caused. On the other hand, such working error can be prevented or reduced by stepwise locking the lock members according to the present invention. Furthermore, like the present embodiment, in a case where the first lock member 5 and the second lock member 6 are engaged with each other by using the engaging portion 61 and the second engaging hook 68 after locking, since the first lock member 5 and the second lock member 6 are stepwise locked, the engaging portion 61 and the second engaging hook 68 can be smoothly engaged with each other.

In the above, the preferable embodiment of the present invention has been described. The present invention is not limited to the embodiment shown in FIGS., various design changes can be allowed within a range not deviating from the purpose.

What is claimed is:

1. A mounting structure for an integrated component of a fuel tank, comprising:
   a weld clip which has a tip part having an engaging portion and a base end part to be welded to an inner surface of the fuel tank;
   an engagement base which is provided to the integrated component to be integrated into the fuel tank, and has a snap-fitting arm to be engaged with the engaging portion by elastic restoring force; and
   a lock member which is attached to the engagement base so as to be capable of switching from a temporary holding position to a lock position, the temporary holding position allowing an elastic deformation of the snap-fitting arm in a direction to release an engagement with the engaging portion, the lock position preventing the elastic deformation,
   wherein the snap-fitting arm comprises an elastic arm which is extended along a periphery of the engaging portion and is capable of being elastically deformed in a radial direction of the engaging portion; and an engaged portion which is provided to the elastic arm and is engaged with the engaging portion,
   wherein the snap-fitting arm is of a plurality and the snap-fitting arms are arranged along the periphery of the engaging portion, and
   wherein each of the snap-fitting arms is prevented from being elastically deformed by holding a free end portion of the elastic arm by the lock member located at the lock position.

2. A mounting structure for an integrated component of a fuel tank, comprising:
   a weld clip which has a tip part having an engaging portion and a base end part to be welded to an inner surface of the fuel tank;
   an engagement base which is provided to the integrated component to be integrated into the fuel tank, and has a snap-fitting arm to be engaged with the engaging portion by elastic restoring force; and
   a lock member which is attached to the engagement base so as to be capable of switching from a temporary holding position to a lock position, the temporary holding position allowing an elastic deformation of the snap-fitting arm in a direction to release an engagement with the engaging portion, the lock position preventing the elastic deformation, wherein the snap-fitting arm comprises an elastic arm which is extended along a periphery of the engaging portion from a base end integrated with a peripheral wall portion of the engagement base and is supported by the peripheral wall portion at the base end with a cantilever supporting structure to be capable of being elastically deformed in a radial direction of the engaging portion; and an engaged portion which is provided to the elastic arm and is engaged with the engaging portion, and wherein the snap-fitting arm is of a plurality and the snap-fitting arms are arranged along the periphery of the engaging portion.

3. The mounting structure for an integrated component of a fuel tank according to claim 2, wherein the snap-fitting arms of three or more are arranged along the periphery of the engaging portion.

4. The mounting structure for an integrated component of a fuel tank according to claim 3, wherein each of the snap-fitting arms is prevented from being elastically deformed by holding a free end portion of the elastic arm by the lock member located at the lock position.

5. The mounting structure for an integrated component of a fuel tank according to claim 3, wherein the lock member comprises a temporary holding release portion which allows the lock member to move to the lock position from the temporary holding position by pushing force of the weld clip.

6. The mounting structure for an integrated component of a fuel tank according to claim 3, wherein the lock member comprises a first lock member and a second lock member which are attached to the engagement base while sliding inward in a radial direction from opposite positions across an axis of the engaging portion.

7. The mounting structure for an integrated component of a fuel tank according to claim 6, wherein the first lock member comprises a temporary holding release portion which allows moving to the lock position from the temporary holding position of the first lock member by pushing force of the weld clip, and wherein the second lock member comprises a second lock member temporary holding release portion which allows moving to the lock position from the temporary holding position of the second lock member by pushing force of the first lock member moving to the lock position from the temporary holding position.

8. The mounting structure for an integrated component of a fuel tank according to claim 2, wherein each of the snap-fitting arms is prevented from being elastically deformed by holding a free end portion of the elastic arm by the lock member located at the lock position.

9. The mounting structure for an integrated component of a fuel tank according to claim 2, wherein the lock member comprises a temporary holding release portion which allows the lock member to move to the lock position from the temporary holding position by pushing force of the weld clip.

10. The mounting structure for an integrated component of a fuel tank according to claim 2, wherein the lock member comprises a first lock member and a second lock member which are attached to the engagement base while sliding inward in a radial direction from opposite positions across an axis of the engaging portion.

11. The mounting structure for an integrated component of a fuel tank according to claim 10, wherein the first lock member comprises a temporary holding release portion which allows moving to the lock position from the temporary holding position of the first lock member by pushing force of the weld clip, and wherein the second lock member comprises a second lock member temporary holding release portion which allows moving to the lock position from the temporary holding position of the second lock member by pushing force of the first lock member moving to the lock position from the temporary holding position.

* * * * *